(12) United States Patent
Chida et al.

(10) Patent No.: US 7,908,666 B2
(45) Date of Patent: Mar. 15, 2011

(54) CONTENT PLAYING SYSTEM FOR RELIABLY DETERMINING AN AUTHENTICATION OF A PLAYING TERMINAL

(75) Inventors: Koichi Chida, Chiba (JP); Kei Kato, Chiba (JP); Yuhiko Fujiwara, Chiba (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1007 days.

(21) Appl. No.: 11/605,460

(22) Filed: Nov. 29, 2006

(65) Prior Publication Data
US 2007/0136824 A1 Jun. 14, 2007

(30) Foreign Application Priority Data
Dec. 12, 2005 (JP) .................................. 2005-357814

(51) Int. Cl.
*G06F 7/04* (2006.01)
*G06F 17/30* (2006.01)
*H04N 7/16* (2006.01)

(52) U.S. Cl. ........................................................ 726/28
(58) Field of Classification Search ..................... 726/28
See application file for complete search history.

(56) References Cited

U.S. PATENT DOCUMENTS
2005/0273399 A1 * 12/2005 Soma et al. ..................... 705/26

FOREIGN PATENT DOCUMENTS
JP 2004-037981 2/2004

* cited by examiner

*Primary Examiner* — Kambiz Zand
*Assistant Examiner* — Stephen Sanders
(74) *Attorney, Agent, or Firm* — Rabin & Berdo, P.C.

(57) ABSTRACT

When a user wishes to play purchased content data by a playing terminal, a registration database server authenticates a user ID. Furthermore, when the playing terminal requests a content server to establish communication, the content server authenticates the playing terminal to thereby establish communication only with the playing terminal of which the user ID authentication and terminal authentication are correct. Consequently, the content data is prevented from being copied to another playing terminal which is owned by a third party, and thus the copyright of the content data can be protected.

4 Claims, 4 Drawing Sheets

CONTENT PLAYING SYSTEM FOR RELIABLY DETERMINING AN AUTHENTICATION OF A PLAYING TERMINAL

BACKGROUND OF THE INVENTION

1. Field of the Invention

The present invention relates to a content playing system that includes a playing terminal which retrieves and plays desired content data such as music and moving pictures, the content data having been purchased from e.g. content providers by the user of the playing terminal and stored in a user's content server at home. The present invention particularly relates to the content playing system that prevents content data from being copied to another playing terminal owned by a third party.

2. Description of the Background Art

Content playing systems which includes a playing terminal have been known recently, in which the playing terminal retrieves and plays desired content data such as music and moving pictures, the content data having been purchased from e.g. content providers by the user of the playing terminal and stored in a user's content server at home. For example, Japanese patent laid-open publication No. 2004-37981 discloses a content playing system for playing music content data to listen to by a driver in a car. Such content data is retrieved from a content server by the driver at home and played by a playing terminal mounted in the car.

As to the playing terminals, ipod (registered trademark of Apple Computer, Inc.), for example, has been known for storing desired content data such as music and moving pictures in its memory to enjoy contents in the open air. This explanation is based on the product information of the iPod presented as of Nov. 29, 2005 on the website on the URL: http://www.apple.com/ipod/ipod.html.

Furthermore, streaming distribution technologies have also been known for playing content data, e.g. music and moving pictures, over a telecommunications network, such as the Internet. In these technologies, a content is sequentially played while its content data is continuously received.

However, these content playing systems are subjected to a problem that, once the content data such as music and moving pictures purchased from e.g. content providers are copied on the memory of the content server, the content data can be transmitted easily from this content server to another which is owned by a third party. Therefore the copyright of the content data could be infringed.

Furthermore, the conventional playing terminals have a difficulty in the physical or storage size thereof. In order to store the large volume of content data such as moving pictures, the playing terminals are required to have large storage capacity, thus the terminals becoming larger in size.

SUMMARY OF THE INVENTION

It is an object of the present invention to provide a content playing system with content data prevented from being copied to another playing terminal which is not authenticated.

In accordance with the present invention, a content playing system including a content server having a server storage in which content data are stored, and a playing terminal for establishing communication with the content server and retrieving desired content data from the server storage to thereby play the retrieved data comprises: a management storage for holding registration authentication data for authenticating a user identification and terminal identification data for identifying the playing terminal; an authentication section which references, upon receipt of the authentication data sent from the playing terminal, the management storage based on the received data, and determines, when registration authentication data matching with the received data is found as stored in the storage, that the authentication is correct; and a transmitter for transmitting the terminal identification data to the content server when the authentication is correct, wherein the content server comprises: a data recorder operative in response to the terminal identification data transmitted from the transmitter for recording the terminal identification data in the server storage as terminal authentication data; a terminal authentication section which is responsive to the terminal identification data sent from the playing terminal to reference the server storage on the basis of the received data, and determines, when terminal authentication data matching with the received data is found as stored in the storage, that the terminal authentication is correct; and a communication controller for establishing the communication between the content server and the playing terminal when the terminal authentication is correct.

In the system stated above, the management storage may hold a destination correspondence table which defines destination data including a communication address of a content server to communicate with in association with the terminal identification data of a playing terminal, wherein the system further comprises: a registration database server for managing communication between the content server and the playing terminal, the registration database server including the management storage, the authentication section and the transmitter; and a server identification section for referencing, when the authentication is correct, the destination correspondence table in the management storage based on the terminal identification data sent from the playing terminal to identify the corresponding destination data; the transmitter transmitting, when the server identification section identifies the destination data, the identified destination data to the playing terminal, and transmitting the terminal identification data to the content server.

In accordance with the present invention, a registration database server provided in a content playing system which includes a content server having a server storage in which content data are stored and a playing terminal for establishing communication with the content server and retrieving desired content data from the server storage to play the content data comprises: a management storage for holding registration authentication data for authenticating a user identification, and a destination correspondence table which defines destination data including the communication address of the content server to communicate with in association with the terminal identification data of the playing terminal; an authentication section which references, upon receipt of the authentication data sent from the playing terminal, the management storage on the basis of the received data, and determines, when registration authentication data matching with the received data is found as stored in the storage, that the authentication is correct; a server identification section for referencing, when the authentication is correct, the destination correspondence table in the management storage based on the terminal identification data sent from the playing terminal to identify the destination data associated with the identification data; and a transmitter for transmitting, when the server identification section identifies the destination data, the identified destination data to the playing terminal, and transmitting the terminal identification data to the content server.

In the system stated above, the playing terminal may comprise a storage for storing content data provided with content identification data for identifying contents; an operation instruction section for urging a user to instruct a selection of either of a playing and a recording control operation of the content data after the communication with the content server is established; a selection instruction section responsive to the recording control operation for recording content data instructed for urging the user to input the content identification data in order to select at least the content data to be recorded; a data identification section for referencing the storage based on the input content identification data to identify content data having the content identification data that matches with the input data; and a transmission controller for transmitting the identified content data to the content server, the data recorder of the content server recording, when receiving the content data from the playing terminal, the content data received in the server storage.

In the system stated above, the playing terminal comprises an operation instruction section for urging a user to instruct a selection of either of a playing and a recording control operation of the content data after the communication with the content server is established; an image shooting section operative in response to the recording control operation instructed for starting image shooting of the content to sequentially output data; a CODEC for encoding the data output from the shooting section depending on at least a classification of the content to produce encoded output data; and a transmission controller responsive to the encoded output data for transmitting the encoded output data to the content server, the data recorder of the content server receiving the encoded output data and producing content data from the encoded output data received to store the produced data in the server storage.

In the content playing system of the present invention, when a user wishes to play purchased content data using a playing terminal, the identification of the user is authenticated. Furthermore, when the playing terminal requests a content server to establish communication, the content server authenticates the playing terminal so as to establish communication only with the playing terminal whose user identification authentication and terminal authentication are correct. Thus, the content data is prevented from being sent from the content server to a playing terminal owned by a third party. Accordingly, the content data is neither transmitted to nor copied by the third party's playing terminal, and thereby the copyright of the content data is protected from infringement.

In addition, since the playing terminal is configured to retrieve the content data from the content server, the terminal does not need a high-capacity memory section for storing a large volume of content data such as movie images. Therefore, the playing terminal does not grow in size.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

Figure 1:
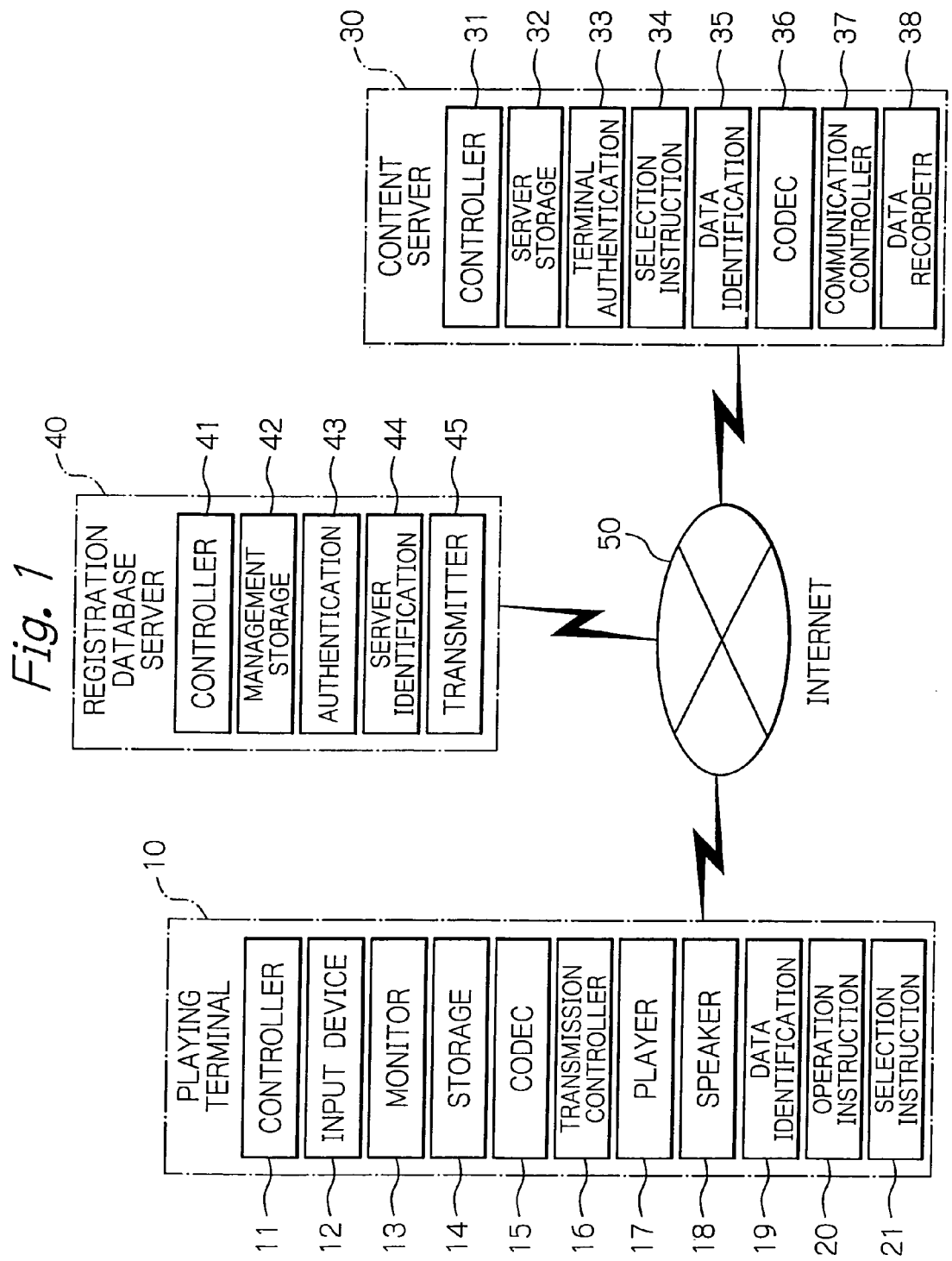
FIG. 1 is a schematic block diagram showing a preferred embodiment of a content playing system in accordance with the present invention.

With reference to the accompanying drawings, a preferred embodiment of the present invention will now be described in detail. Referring first to FIG. 1, a preferred embodiment of a content playing system of the present invention shown in the form of schematic block diagram generally consists of a playing terminal 10, a registration database server 40 and a content server 30. The registration database server 40 is connected to the content server 30 via the Internet 50. The playing terminal 10 is wirelessly communicably connected to the registration database server 40 and the content server 30 over the Internet 50.

The playing terminal 10 is adapted to be operated by a user to play content data such as music and moving pictures, and comprises a controller 11, an input device 12 such as a push button, a display monitor 13 consisting of e.g. a liquid crystal display, a storage 14, a CODEC (COder/DECoder) 15, a transmission controller 16, a player 17, a loudspeaker or earphone 18, a data identification section 19, an operation instruction section 20 and a selection instruction section 21.

The storage 14 is a memory which consists of a large capacity storage device such as a hard disk drive (HDD) and the like. The storage 14 holds, for example, terminal identification data, such as serial numbers, for identifying the playing terminal 10 and destination data containing the IP (Internet Protocol) address of the registration database server 40.

The storage 14 also stores content data such as minutes produced by the user by recording with a microphone, not shown, of the playing terminal 10. Every content data is applied with content identification data, e.g. a content name, for identifying that content.

The registration database server 40 is administered by e.g. a content provider and is adapted to manage the communication between the playing terminal 10 of the user who purchased content data and the content server 30 which shall communicate with the playing terminal 10. The registration database server 40 comprises a controller 41, a management storage 42, an authentication section 43, a server identification section 44 and a transmitter 45.

The management storage 42 is a memory which consists of a large-capacity storage device, such as a hard disk storage device. In order to authenticate a user for the playing terminal 10, the management storage 42 holds, in advance, registration authentication data composed of a pre-registered identification (ID) and password of the user, and a destination correspondence table which defines the destination data containing e.g. the IP address of the content server 30, with which the playing terminal 10 communicates, in correspondence with the terminal identification data of the playing terminal 10. In the instant embodiment, the registration authentication data and the destination correspondence table are registered, when the user of the playing terminal 10 purchases content data from the content provider, with the management storage 42 by the administrator of the registration database server 40 using an administrative terminal, not shown. The storage 42 can hold plural entries of registration authentication data for each of a plurality of users, and also hold a plurality of destination correspondence tables for each of a plurality of playing terminals, such as terminal 10.

The content server 30 is owned by the user of the playing terminal 10 and adapted to provide content data such as music and moving pictures to the playing terminal 10. The content server 30 comprises a controller 31, a server storage 32, a terminal authentication section 33, a selection instruction section 34, a data identification section 35, a CODEC 36, a communication controller 37 and a data recorder 38.

The server storage 32 is also a memory consisting of a large-capacity storage medium, such as a hard disk storage medium. The server storage 32 holds server identification data for identifying the content server 30 and content data such as music and moving pictures. Each content data is applied with content identification data, e.g. a content name, for identifying that content. Furthermore, the content data may be provided from a content delivery server, not shown, of the content provider to the content server 30 at the time of purchasing the data so as to be stored in the server storage 32.

In the following, description will now be made on the interrelation between the playing terminal 10, the registration database server 40 and the content server 30 in the process of playing content data of music, moving pictures, etc., by the playing terminal 10.

The controller 11 of the playing terminal 10 may be implemented by a central processor unit (CPU) which is adapted for controlling the playing terminal 10 to thereby have the monitor 13 display an entry window as an initial screen for urging the user to input the authentication data consisting of his or her ID and password of the playing terminal 10.

When the user inputs his or her authentication data according to the entry screen via the input device 12, the controller 11 transfers the input authentication data to the transmission controller 16.

The transmission controller 16 is adapted to control the communication of the playing terminal 10 with the registration database server 40 or the content server 30. The transmission controller 16 receives the authentication data thus transmitted, and references the storage 14 to retrieve the terminal identification data. The transmission controller 16 in turn transmits to the registration database server 40 the authentication data and the terminal identification data on the basis of the destination data stored in the storage 14.

The controller 41 of the registration database server 40, implemented by a CPU, controls the registration database server 40. When the registration database server 40 receives the authentication data and the terminal identification data, the controller 41 temporarily stores the terminal identification data in the management storage 42, while transferring the authentication data to the authentication section 43.

The authentication section 43 authenticates the user ID. Upon receipt of the authentication data, the authentication section 43 references the management storage 42 on the basis of the received data. If the authentication section 43 locates registration authentication data stored in the storage 42 and matching with the received data, then it determines that the authentication is correct, and, if not, it determines that the authentication is wrong.

When the authentication section 43 determines that the authentication is wrong, the controller 41 sends a signal denoting the failure of the authentication to the playing terminal 10.

When the playing terminal 10 receives the authentication failure signal, the controller 11 of the terminal 10 generates screen information indicating the failure of the authentication to have the monitor 13 display an authentication failure screen according to the generated information.

When the authentication section 43 determines that the authentication is correct, the controller 41 transfers the terminal identification data stored temporarily in the management storage 42 to the server identification section 44.

The server identification section 44 identifies the content server 30 with which the playing terminal 10 communicates. When the server identification section 44 receives the terminal identification data, the section 44 references the destination correspondence table in the management storage 42 on the basis of the received data, and identifies the destination data of the corresponding content server 30.

The transmitter 45 controls the data communication with the playing terminal 10 or the content server 30. When the server identification section 44 identifies the destination data, the transmitter 45 transmits the identified data to the playing terminal 10, while transmitting the terminal identification data in the management storage 42 to the content server 30.

When the content server 30 receives the terminal identification data, the controller 31 of the server 30 transfers the received data to the data recorder 38.

When the data recorder 38, adapted to record received data in the server storage 32, receives the terminal identification data, it records in the server storage 32 the terminal identification data as terminal authentication data to use for the identification of the playing terminal 10, which will be described later.

On the other hand, the controller 11 of the playing terminal 10 transfers, upon receipt of the destination data, the data to the transmission controller 16 so as to establish the communication with the content server 30.

Upon receipt of the destination data, the transmission controller 16 references the storage 14 to retrieve the terminal identification data and then transmits the retrieved data to the content server 30 based on the destination data.

The controller 31 of the content server 30, implemented by a CPU, controls the content server 30. Upon receipt of the terminal identification data, the controller 31 transfers the data to the terminal authentication section 33.

The terminal authentication section 33 authenticates the playing terminal 10 which is the source of the request to establish the communication. When the terminal authentication section 33 receives the terminal identification data, the authentication section 33 references the server storage 32 based on the received data. When terminal identification data stored in the storage 32 is found matching with the received data, the authentication section 33 determines that the authentication is correct, or otherwise determines that the authentication is wrong.

When the terminal authentication section 33 determines that the authentication is wrong, the controller 31 sends a signal denoting the failure of the authentication to the playing terminal 10.

When the playing terminal 10 receives the authentication failure signal, the controller 11 of the terminal 10 generates screen information indicating the failure of the authentication to have the monitor 13 display an authentication failure screen according to the authentication failure screen information.

When the authentication section 33 determines that the authentication is correct, the controller 31 sends a signal denoting the success of the authentication to the communication controller 37.

The communication controller 37 controls the communication of the content server 30 with the playing terminal 10 or the registration database server 40. Upon receipt of the authentication success signal, the communication controller 37 establishes the communication with the playing terminal 10 and then sends to the playing terminal 10 a notice signal indicative of completion of the establishment of the communication.

When the playing terminal 10 receives the notice signal, the controller 11 of the terminal 10 transfers the received signal to the operation instruction section 20.

The operation instruction section 20 prompts the user to select either "playing" or "recordation" control operation of the content data. Upon receipt of the notice signal stated above, the operation instruction section 20 generates control selection screen information urging the user to select the playing or recordation operation. The monitor 13 displays a control selection screen based on the information.

When the user references the control selection screen and operates the input device 12 to select "playing" of the content data, the controller 11 generates a control instruction signal for playing the content data selected to send the generated signal to the content server 30. When the user similarly selects "recordation" of the content data, the controller 11 detects that the "recordation" is selected and generates a control instruction signal for recording the content data selected to transfer the signal to the selection instruction section 21. Thus, the playing or the recordation operation is executed in response to the user's selection.

Following is the description of the playing procedure of content data which has been purchased from a content provider by the user and stored in the server storage 32 of the content server 30.

The user first watches the control selection screen and manipulates the input device 12 to select "playing" of the content data. In response to the selection, the controller 11 generates a control instruction signal for playing the content data and sends the generated signal to the content server 30 through the transmission controller 16. When the content server 30 receives the control instruction signal, the controller 31 transfers the received signal to the selection instruction section 34.

Upon receipt of the control instruction signal instructing the playing of the content data, the selection instruction section 34, adapted to urge the user to input content identification data, etc., generates selection screen information of playing instruction for selecting from the content data stored in the server storage 32 content identification data for identifying the content that the user desired to be played, content classification data indicative that the subject content is music or moving pictures, and encoding instruction data representing an encoding method for the subject content. The selection instruction section 34 then sends the generated information to the playing terminal 10.

When the playing terminal 10 receives the selection screen information of playing instruction, the controller 11 of the terminal 10 has the monitor 13 display a selection screen of playing instruction according to the received information.

Subsequently, the user refers to the selection screen and operates the input device 12 to select the content identification data, the content classification data and the encoding instruction data. In response, the controller 11 transmits the selected data to the content server 30 via the transmission controller 16.

When the content server 30 receives the selected data, the controller 31 of the server 30 temporarily stores the received data in the server storage 32 and then transfers the content identification data to the data identification section 35.

Upon receipt of the content identification data, the data identification section 35, adapted to identify selected content data, references the server storage 32 on the basis of the received data to identify content data having corresponding content identification data.

When the data identification section 35 identifies the content data, the CODEC 36, adapted to encode and decode data, retrieves the content classification data and the encoding instruction data from the server storage 32 to execute encoding of the identified content data based on both retrieved data, thereby generating encoded output data.

The controller 31 in turn transfers the encoded output data, which is generated by the CODEC 36, to the communication controller 37.

Upon receipt of the encoded output data, the communication controller 37 transmits to the playing terminal 10 the encoded output data together with the content classification data and the encoding instruction data stored in the server storage 32.

When the playing terminal 10 receives these data, the transmission controller 16 of the playing terminal 10 transfers these data to the CODEC 15. Upon receipt of the encoded output data, the CODEC 15 decodes the encoded data based on the provided content classification data and encoding instruction data to thereby generate output data.

Then the controller 11 transfers the output data, which is generated by the CODEC 15, to the player 17. When the player 17, adapted to execute playing control in a solution suitable for received output data, receives the output data, it plays, on the basis of the received data, the content selected by the user. Of the content data, the player 17 plays, for example, audio data through the loudspeaker 18 or moving picture data through the monitor 13 and the speaker 18.

In this way, when the user plays the purchased data in the playing terminal 10, the registration database server 40 firstly authenticates the user ID. In the event the authentication is correct, the database server 40 informs the playing terminal 10 about the content server 30 with which the terminal 10 can establish communication. When the terminal 10 requests the establishment of a communication, the content server 30 authenticates the playing terminal 10 so as to establish the communication only with the playing terminal 10 that is correctly authenticated. Thus, the content data can be prevented from being sent from the content server 30 to a playing terminal of a third party. Consequently, the content data can be prevented from being transmitted to and copied by the third party, thereby protecting the copyright of the content data from infringement.

In the next place, the recording procedure will be described which will be proceeded when the user references the control selection screen and manipulates the input device 12 to select, and instruct the recording of, content data which he or she produced and stored in the storage 14 of the playing terminal 10.

When the user references the control selection screen and manipulates the input device 12 to select "recordation" of the content data, the controller 11 detects that the "recordation" is selected and generates a control instruction signal for instructing the thus selected recording of the content data to send the generated signal to the selection instruction section 21.

The selection instruction section 21, adapted to prompt the user to input content identification data, etc., for identifying the content to be recorded. Upon receipt of the control instruction signal, the selection instruction section 21 generates selection screen information of recordation instruction for selecting from the content data stored in the storage 14 content identification data for identifying the content that the user desired to be recorded, content classification data indicative that the subject content is music or moving pictures, and encoding instruction data representing an encoding method for the subject content. Then, the selection instruction section 21 has the monitor 13 display a selection screen of recordation instruction according to the received selection screen information thus generated.

When the user references the selection screen and operates the input device 12 to selectively enter the content identification data, the content classification data and the encoding instruction data, the controller 11 temporarily stores the input data in the storage 14 and then transfers the content identification data to the data identification section 19.

The data identification section 19, adapted to identify selected content data, receives the content identification data, and references the storage 14 on the basis of the received data to identify content data having corresponding content identification data.

When the data identification section 19 identifies the content data, the CODEC 15 retrieves the content classification data and the encoding instruction data from the storage 14 to encode the identified content data based on both retrieved data, thereby generating encoded output data.

The controller 11, in turn, transfers the encoded output data, which is generated by the CODEC 15, to the transmission controller 16.

Upon receipt of the encoded output data, the transmission controller 16 transmits to the content server 30 the encoded output data together with the content classification data and the encoding instruction data stored in the storage 14.

When the content server 30 receives the encoding instruction data, the controller 31 of the server 30 transfers the encoded output data to the data recorder 38.

The data recorder 38, adapted to record received data in the server storage 32, receives the encoding instruction data, and records the received encoded output data in the storage 32.

When the data is recorded in the server storage 32, the controller 31 sends to the playing terminal 10 a recordation completion signal denoting that the data is recorded in the storage 32.

When the playing terminal 10 receives the completion signal, the controller 11 of the terminal 10 generates screen information indicative of completion of the recordation, thereby having the monitor 13 display a recordation completion screen based on the generated screen information. Consequently, the user of the playing terminal 10 can confirm that the selected content data has been recorded in the server storage 32 of the content server 30.

Figure 2:
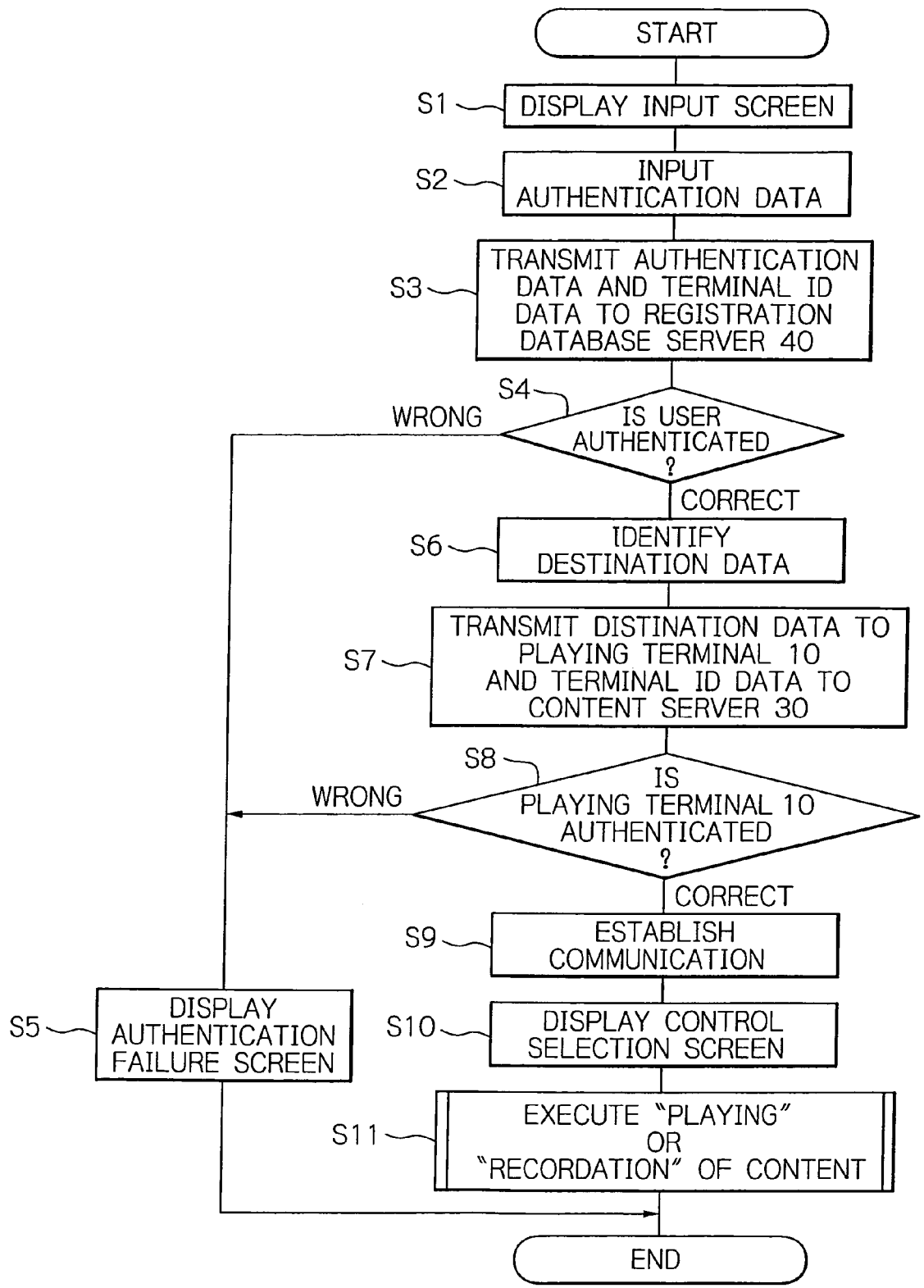
FIG. 2 is a flowchart useful understanding the operation of the content playing system of the preferred embodiment.

The operation of the content playing system of the present preferred embodiment will now be described. FIG. 2 is a flowchart for use in understanding the operation of the content playing system of the preferred embodiment. The controller 11 of the playing terminal 10 has the monitor 13 display the entry screen as its initial screen for prompting the user of the playing terminal 10 to enter the authentication data consisting of his or her ID and password (Step S1).

When the user inputs his or her authentication data according to the entry screen via the input device 12 (Step S2), the controller 11 transfers the input authentication data to the transmission controller 16.

After the reception of the authentication data, the transmission controller 16 references the storage 14 to retrieve the terminal identification data, and transmits to the registration database server 40 the authentication data and the terminal identification data on the basis of the destination data stored in the storage 14 (Step S3).

When the registration database server 40 receives the authentication data and the terminal identification data, the controller 41 of the server 40 temporarily stores the terminal identification data in the management storage 42, while transferring the authentication data to the authentication section 43.

Upon receipt of the authentication data, the authentication section 43 references the management storage 42 on the basis of the received data. If registration authentication data matching with the received data is stored in the storage 42, the authentication section 43 determines that the authentication is correct, or, if not, determines that the authentication is wrong (Step S4).

When the authentication section 43 determines that the authentication is wrong, the controller 41 sends a signal denoting the failure of the authentication to the playing terminal 10.

When the playing terminal 10 receives the authentication failure signal, the controller 11 of the terminal 10 generates screen information indicating the failure of the authentication to have the monitor 13 display an authentication failure screen according to the generated information (Step S5).

When the authentication section 43 determines that the authentication is correct, the controller 41 transfers the terminal identification data stored temporarily in the management storage 42 to the server identification section 44.

Upon receipt of the terminal identification data, the server identification section 44 references the destination correspondence table in the management storage 42 on the basis of the received data so as to identify the destination data of the corresponding content server 30 (Step S6).

When the server identification section 44 identifies the destination data, the transmitter 45 transmits the identified data to the playing terminal 10 (Step S7), while transmitting the terminal identification data in the management storage 42 to the content server 30.

When the content server 30 receives the terminal identification data, the controller 31 of the server 30 transfers the received data to the data recorder 38.

Upon receipt of the terminal identification data, the data recorder 38 records in the server storage 32 the received data as terminal authentication data to use for the identification of the playing terminal 10, which will be described later.

On the other hand, when the playing terminal 10 receives the destination data, the controller 11 of the terminal 10 transfers the received data to the transmission controller 16 so as to establish the communication with the content server 30.

Upon receipt of the destination data, the transmission controller 16 references the storage 14 to retrieve the terminal identification data and then transmits the retrieved data to the content server 30 based on the destination data.

When the content server 30 receives the terminal identification data, the controller 31 of the server 30 transfers the received data to the terminal authentication section 33.

Upon receipt of the terminal identification data, the terminal authentication section 33 references the server storage 32 based on the received data. When terminal identification data matching with the received data is found as stored, the authentication section 33 determines that the authentication is correct, or otherwise determines that the authentication is wrong (Step S8).

When the terminal authentication section 33 determines that the authentication is wrong, the controller 31 sends a signal denoting the failure of the authentication to the playing terminal 10.

When the playing terminal 10 receives the authentication failure signal, the controller 11 of the terminal 10 generates screen information indicating the failure of the authentication to have the monitor 13 display an authentication failure screen according to the authentication failure screen information thus generated (Step S5).

When the authentication section 33 determines that the authentication is correct, the controller 31 sends a signal denoting the success of the authentication to the communication controller 37.

Upon receipt of the authentication success signal, the communication controller 37 establishes the communication with the playing terminal 10 (Step S9) and then sends to the playing terminal 10 a notice signal indicative of completion of the establishment of the communication.

When the playing terminal 10 receives the notice signal indicating the completion of the communication establishment, the controller 11 of the terminal 10 transfers the received signal to the operation instruction section 20.

Upon receipt of the notice signal, the operation instruction section 20 generates control selection screen information for urging the user to selectively input the playing or recordation operation, and have the monitor 13 display a control selection screen based on the information thus generated (Step S10).

Subsequently, when the user references the control selection screen and selects "playing" via the input device 12, the controller 11 generates a control instruction signal for instructing the playing of the content data to send the generated signal to the content server 30. When the user selects "recordation" of the content data, the controller 11 detects that the "recordation" is selected and generates a control instruction signal for instructing the recordation thus selected of the content data to transfer the signal to the selection instruction section 21. In turn, the playing or the recordation operation is executed in response to the user's selection (Step S11).

Figure 3:
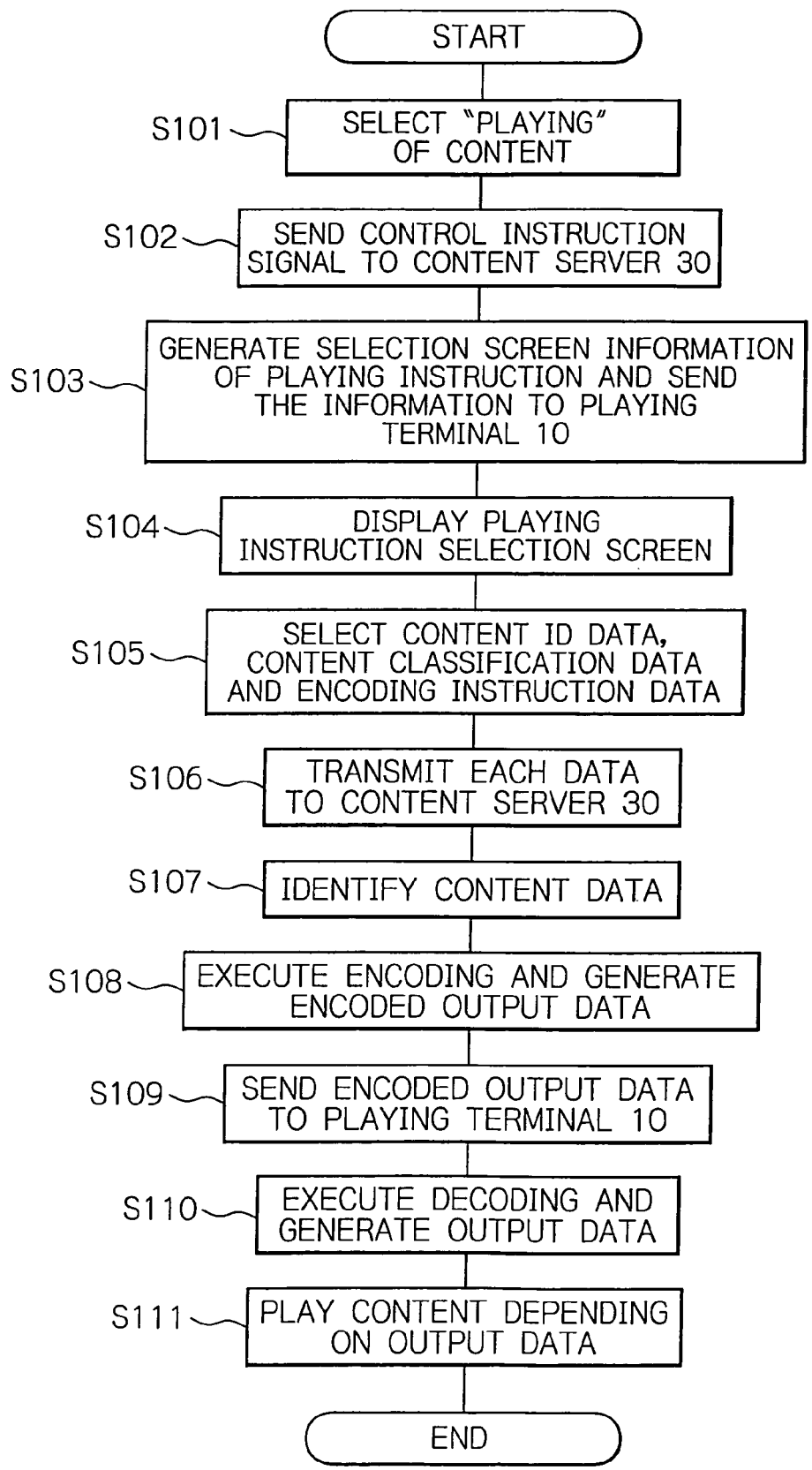
FIG. 3 is a flowchart useful for understanding the playing operation of the content playing system of the preferred embodiment.

Following is the description of the playing procedure of content data which has been purchased from a content provider, not shown, by the user and stored in the server storage 32 of the content server 30. FIG. 3 is a flowchart useful for understanding the playing operation of the content playing system of the preferred embodiment.

When the user references the control selection screen and selects "playing" of the content data via the input device 12 (Step S101), the controller 11 generates a control instruction signal for playing the content data and sends the generated signal to the content server 30 through the transmission controller 16 (Step S102).

When the content server 30 receives the control instruction signal, the controller 31 of the server 30 transfers the received signal to the selection instruction section 34.

Upon receipt of the control instruction signal instructing the playing of the content data, the selection instruction section 34 generates selection screen information of playing instruction for selecting from the content data stored in the server storage 32 content identification data for identifying the content to be played, content classification data indicative that the subject content is music or moving pictures, and encoding instruction data representing an encoding method for the subject content. The selection instruction section 34 then sends the generated information to the playing terminal 10 (Step S103).

When the playing terminal 10 receives the selection screen information of playing instruction, the controller 11 of the terminal 10 has the monitor 13 display a selection screen of playing instruction according to the received information (Step S104).

Then, according to the selection screen, the user selectively inputs the content identification data, the content classification data and the encoding instruction data through the input device 12 (Step S105). The controller 11 transmits the input data to the content server 30 via the transmission controller 16 (Step S106).

When the content server 30 receives the input data, the controller 31 of the server 30 temporarily stores the received data in the server storage 32 and then transfers the content identification data to the data identification section 35.

Upon receipt of the content identification data, the data identification section 35 references the server storage 32 on the basis of the received data to identify content data having corresponding content identification data (Step S107).

When the data identification section 35 identifies the content data, the CODEC 36 retrieves the content classification data and the encoding instruction data from the server storage 32 to execute encoding of the identified content data based on both retrieved data, thereby generating encoded output data (Step S108).

The controller 31 in turn transfers the encoded output data, which is generated by the CODEC 36, to the communication controller 37.

Upon receipt of the encoded output data, the communication controller 37 sends to the playing terminal 10 the encoded output data together with the content classification data and the encoding instruction data stored in the server storage 32 (Step S109).

When the playing terminal 10 receives these data, the transmission controller 16 of the playing terminal 10 transfers these data to the CODEC 15.

Upon receipt of the encoded output data, the CODEC 15 decodes the encoded data based on the provided content classification data and encoding instruction data to thereby generate output data (Step S110).

Then the controller 11 transfers the output data, which is generated by the CODEC 15, to the player 17. Upon receipt of the output data, the player 17 plays, depending on the output data, the content selected by the user, e.g. audio data of the content data through the speaker 18 or moving pictured at a through the monitor 13 and the speaker 18 (Step S111).

In this way, when the user plays the purchased data in the playing terminal 10, the registration database server 40 firstly authenticates the user ID. In the event the authentication is correct, the database server 40 informs the playing terminal 10 about the content server 30 with which the terminal 10 can establish communication. When the terminal 10 requests the establishment of a communication, the content server 30 authenticates the playing terminal 10 so as to establish the communication only with the playing terminal 10 that is correctly authenticated. Thus, the content data can be prevented from being sent from the content server 30 to a playing terminal of third party. Consequently, the content data can be prevented from being copied by the third party, thereby protecting the copyright of the content data from infringement.

Figure 4:
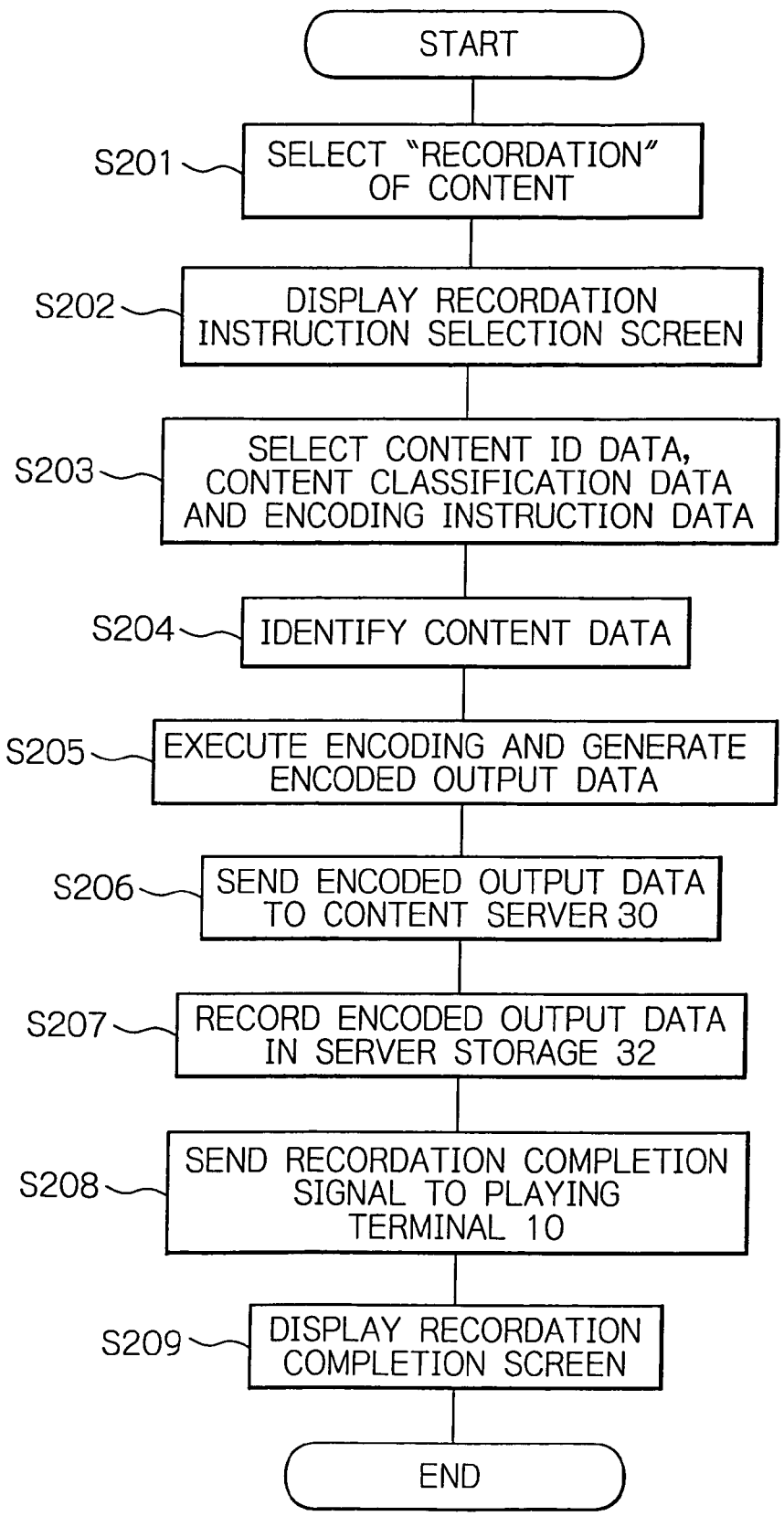
FIG. 4 is a flowchart useful for understanding the recordation operation of the content playing system of the preferred embodiment.

In the next place, the recording procedure of content data will be described which has been produced by the user and stored in the storage 14 of the playing terminal 10. FIG. 4 is a flowchart useful for understanding the recordation operation of the content playing system of the preferred embodiment.

When the user references the control selection screen and selects "recordation" of the content data via the input device 12 (Step S201), the controller 11 detects that the "recordation" is selected and generates a control instruction signal for recording the content data to send the generated signal to the selection instruction section 21.

Upon receipt of the control instruction signal, the selection instruction section 21 generates selection screen information of recordation instruction for selecting from the content data stored in the storage 14 content identification data for identifying the content to be recorded, content classification data indicative that the subject content is music or moving pictures, and encoding instruction data representing an encoding method for the subject content. Then, the selection instruction section 21 has the monitor 13 display a selection screen of recordation instruction according to the received selection screen information (Step S202).

Subsequently, when the user references the selection screen and selectively inputs the content identification data, the content classification data and the encoding instruction data through the input device 12 by (Step S203), the controller 11 temporarily stores the input data in the storage 14 and then transfers the content identification data to the data identification section 19.

Upon receipt of the content identification data, the data identification section 19 references the storage 14 on the basis of the received data to identify content data having corresponding content identification data (Step S204).

When the data identification section 19 identifies the content data, the CODEC 15 retrieves the content classification data and the encoding instruction data from the storage 14 to encode the identified content data based on both retrieved data, thereby generating encoded output data (Step S205).

The controller 11, in turn, transfers the encoded output data, which is generated by the CODEC 15, to the transmission controller 16.

Upon receipt of the encoded output data, the transmission controller 16 transmits to the content server 30 the encoded output data together with the content classification data and the encoding instruction data stored in the storage 14 (Step S206).

When the content server 30 receives the encoded output data, the controller 31 of the server 30 transfers the received data to the data recorder 38. After the reception of the encoded output data, the data recorder 38 records the data in the server storage 32 (Step S207).

When the data is recorded in the server storage 32, the controller 31 sends to the playing terminal 10 a recordation completion signal denoting that the data is recorded in the storage 32 (Step S208).

When the playing terminal 10 receives the completion signal, the controller 11 of the terminal 10 generates screen information indicative of completion of the recordation, thereby having the monitor 13 display a recordation completion screen based on the generated screen information (Step S209). Consequently, the user of the playing terminal 10 can confirm that the selected content data has been recorded in the server storage 32 of the content server 30.

In this way, when the user plays the purchased data in the playing terminal 10, the registration database server 40 firstly authenticates the user ID. In the event the authentication is correct, the database server 40 informs the playing terminal 10 about the content server 30 with which the terminal 10 can establish communication. When the terminal 10 requests the establishment of a communication, the content server 30 authenticates the playing terminal 10 so as to establish the communication only with the playing terminal 10 that is correctly authenticated. Thus, the content data can be prevented from being sent from the content server 30 to a playing terminal of a third party. Consequently, the content data can be prevented from being copied by the third party by sending the content data from the playing terminal 10 to that of the third party, thereby protecting the copyright of the content data from infringement.

In addition, the content server 30 sends to the playing terminal 10 of the user the encoded output data into which the content data is encoded, thereby preventing the content data per se from being copied to the playing terminal 10. Therefore, the content data can be prevented from being transferred from the playing terminal 10 to that of the third party and copied by the third party, thereby protecting the copyright of the content data from infringement.

Furthermore, the playing terminal 10 sends the encoded output data of the content data recorded in the storage 14 to the content server 30 with which the communication has been established. Upon receipt of the encoded output data, the content server 30, in turn, records the data in the server storage 32. Consequently, the storage 14 does not need a large-capacity memory for storing a large amount of content data such as shot moving pictures, so that the playing terminal does not grow in size.

The above-described embodiment is directed to the content server 30 owned by the user of the playing terminal 10, but the invention is not limited to such a specific type. Alternatively, any content server administered by e.g. a content provider is applicable.

As described above, in the present embodiment, the content data generated by the user is stored in the storage 14 of the playing terminal 10 and is encoded into output data appropriate for being recorded in the server storage 32 of the content server 30, but the invention is not limited to such a specific type of configuration.

For example, the playing terminal 10 may be provided with a shooting section consisting of, e.g. a camera. When the communication between the playing terminal 10 and the content server 30 is established after the authentication of the user and the terminal 10 and the user selects the "recordation" operation, the shooting section starts image shooting. Every time an image is shot, the playing terminal 10 continuously encodes the image data into output data so as to sequentially send encoded data to the content server 30. The content server 30 stores the encoded output data in the memory. When the playing terminal 10 sends to the content server 30 a signal which indicates, for example, the completion of shooting, the content server 30 generates content data from the stored encoded output data to record in the server storage 32. Accordingly, the playing terminal 10 does not need large-capacity memory, and therefore the size of the terminal 10 does not grow.

The above-described embodiment is configured to execute either the "playing" or "recordation" operation selected by the user of the playing terminal 10, but the invention is not limited to the specific configuration. Alternatively, the playing terminal 10 may be adapted to encode the content data, stored in the storage 14, into output data during playing of the content, and then sends the encoded data to the content server 30 so as to record the data in the server storage 32. In addition, the system may be adapted such that, while playing the content, the shooting section executes shooting, sequentially encodes the image data of the shot images to generate output data, and sends in turn the encoded output data to the content server 30, and then the content server 30 generates, as described above, content data upon receipt of the signal indicating the completion of the shooting so as to record the content data in the server storage 32.

The entire disclosure of Japanese patent application No. 2005-357814 filed on Dec. 12, 2005, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A content playing system including a content server having a server storage in which content data are stored, and a playing terminal for establishing communication with said content server and retrieving desired content data from said server storage to play the content data, comprising:
   a management storage for holding registration authentication data for authenticating a user identification of said playing terminal and terminal identification data for identifying said playing terminal;
   an authentication section for referencing, upon receipt of the authentication data sent from said playing terminal, said management storage based on the received data, and for determining, when registration authentication data matching with the received data is found as stored in said management storage, that the authentication is correct; and
   a transmitter for transmitting the terminal identification data to said content server when the authentication is correct,
   said content server comprising:
      a data recorder operative in response to the terminal identification data transmitted from said transmitter for recording the terminal identification data in said server storage as terminal authentication data;
      a terminal authentication section operative in response to the terminal identification data sent from said playing terminal for referencing said server storage based on the received data to perform terminal authentication of said playing terminal, and for determining, when terminal authentication data matching with the received data is found as stored in said management storage, that the terminal authentication is correct; and
      a communication controller for establishing, when the terminal authentication is correct, the communication between said content server and said playing terminal, and
   said playing terminal including
      an operation instruction section for urging a user to instruct at least a playing of the content data after the communication with said content server is established, wherein, when the playing of the content data is instructed by said operation instruction section, said playing terminal continuously receives the content data from said server storage without copying the received content data to said playing terminal, while sequentially playing the received content data.

2. The system in accordance with claim 1, wherein said management storage holds a destination correspondence table, which defines destination data including a communication address of a content server to communicate with in association with the terminal identification data of a playing terminal,
   said system further comprising:
      a registration database server for managing communication between said content server and said playing terminal, said registration database server including said management storage, said authentication section and said transmitter; and
      a server identification section for referencing, when said authentication section determines the authentication is correct, said destination correspondence table in said management storage based on the terminal identification data sent from said playing terminal to identify the destination data associated with the terminal identification data,
   said transmitter transmitting, when said server identification section identifies the destination data, the identified destination data to said playing terminal, and transmitting the terminal identification data to said content server.

3. The system in accordance with claim 1, wherein
said operation instruction section of said playing terminal urges the user to instruct a selection of either of a control operation of the playing and a recording control operation of the content data, after the communication with said content server is established, and
said playing terminal further includes:
   a storage for storing content data provided with content identification data for identifying a content;
   a selection instruction section operative in response to the recording control operation for content data instructed by said operation instruction section for urging the user to input the content identification data identifying the content data in order to select at least the content data to be recorded;
   a data identification section for referencing said content data storage based on the input content identification data to identify content data having the content identification data that matches with the input data; and
   a transmission controller for transmitting the content data to said content server when said data identification section identifies the content data,
said data recorder recording, when receiving the content data from said playing terminal, the content data received in said server storage.

4. The system in accordance with claim 1, wherein
said operation instruction section of said playing terminal urges, after the communication with said content server is established, the user to instruct a selection of either of a control operation of the playing and a recording control operation of the content data, and
said playing terminal further includes:
   an image shooting section operative in response to the recording control operation instructed by said operation instruction section for recording content data instructed for starting image shooting of a content to sequentially output data;
   a CODEC for encoding the data output from said shooting section depending on at least a classification of the content to produce encoded output data; and
   a transmission controller responsive to the encoded output data for transmitting the encoded output data to said content server,
said data recorder receiving the encoded output data and producing content data from the encoded output data received to store the produced data in said server storage.

* * * * *